(12) United States Patent
Bastos Abibe et al.

(10) Patent No.: US 9,925,720 B2
(45) Date of Patent: Mar. 27, 2018

(54) METHOD FOR JOINING A PLASTIC WORKPIECE TO A FURTHER WORKPLACE

(71) Applicant: Helmholtz-Zentrum Geesthacht Zentrum für Material - und Küstenforschung GmbH, Geesthacht (DE)

(72) Inventors: André Bastos Abibe, Geesthacht (DE); Sergio de Traglia Amancio Filho, Börnsen (DE); Marilia Sônego, Araraquara (BR); Jorge Fernandez dos Santos, Tespe (DE)

(73) Assignee: Helmholtz-Zentrum Geesthacht Zentrum für Material - und Küstenforschung GmbH, Geesthacht (DE)

( * ) Notice: Subject to any disclaimer, the term of this patent is extended or adjusted under 35 U.S.C. 154(b) by 376 days.

(21) Appl. No.: 14/807,911

(22) Filed: Jul. 24, 2015

(65) Prior Publication Data
US 2016/0059476 A1 Mar. 3, 2016

(30) Foreign Application Priority Data

Aug. 29, 2014 (EP) .................................... 14182938

(51) Int. Cl.
*B29C 65/00* (2006.01)
*B29C 65/06* (2006.01)
(Continued)

(52) U.S. Cl.
CPC ........ *B29C 66/304* (2013.01); *B29C 65/0681* (2013.01); *B29C 65/606* (2013.01);
(Continued)

(58) Field of Classification Search
CPC .................................................. B29C 66/304
See application file for complete search history.

(56) References Cited

U.S. PATENT DOCUMENTS

| 2007/0158011 A1 | 7/2007 | Tominaga et al. |
| 2010/0096438 A1* | 4/2010 | Sato .................... B23K 20/1225 228/114 |
| 2013/0098534 A1* | 4/2013 | de Traglia Amancio Filho .................... B29C 65/0681 156/73.5 |

FOREIGN PATENT DOCUMENTS

| DE | 3109500 A1 | 10/1982 |
| JP | H04142919 A | 5/1992 |

OTHER PUBLICATIONS

International Search Report for European Patent Application No. 14182938.2 dated Feb. 13, 2015.

* cited by examiner

*Primary Examiner* — Ryan Ochylski
(74) *Attorney, Agent, or Firm* — Harness, Dickey & Pierce, P.L.C.

(57) ABSTRACT

A method that includes: arranging plastic and further workpieces (1, 3) such that an abutment surface (5) of the plastic workpiece (1) is abutted to a first surface (13) on the further workpiece (3) and a projection (7) on the plastic workpiece (1) extends through a through hole (17) in the further workpiece (3); linearly moving a friction tool (23) parallel to its rotational axis (25) such that a friction surface (31) on the tool (23) contacts a front surface (9) of the projection (7); linearly moving the tool (23) along the rotational axis (25) while rotating the tool (23) so that a pin (29) on the tool (23) penetrates and plasticizes the projection (7) as well as drives a portion of the plasticized projection (7) into an undercut (21) formed in the hole (17) of the further workpiece (3); and retracting the tool (23) from the projection (7).

15 Claims, 5 Drawing Sheets

(51) Int. Cl.
*B29C 65/60* (2006.01)
*B29C 65/64* (2006.01)
(52) U.S. Cl.
CPC ........ *B29C 65/645* (2013.01); *B29C 66/1122* (2013.01); *B29C 66/14* (2013.01); *B29C 66/322* (2013.01); *B29C 66/326* (2013.01); *B29C 66/346* (2013.01); *B29C 66/41* (2013.01); *B29C 66/742* (2013.01); *B29C 66/81429* (2013.01); *B29C 66/8322* (2013.01); *B29C 66/45* (2013.01)

METHOD FOR JOINING A PLASTIC WORKPIECE TO A FURTHER WORKPLACE

CROSS-REFERENCE TO RELATED APPLICATIONS

This application claims the benefit and priority of European Patent Application No. 14182938.2, filed Aug. 29, 2014, the entire disclosure of which is incorporated by reference as if fully set forth in detail herein.

FIELD

The present disclosure relates to a method for joining, i.e. connecting, a plastic workpiece to a further workpiece.

BACKGROUND

This section provides background information related to the present disclosure which is not necessarily prior art.

Various methods are known in the art for joining a plastic workpiece to a further workpiece. For example, DE 3 109 500 A1 discloses such a method, wherein a plastic workpiece having an abutment surface and a projection projecting away from the abutment surface, and a further workpiece having a first surface, a second surface opposite to the first surface, and a through hole which connects the first surface to the second surface are provided. The plastic workpiece and the further workpiece are arranged relative to one another such that the abutment surface of the plastic workpiece abuts on the first surface of the further workpiece and the projection extends through the through hole such that the front surface of the projection exceeds the second surface of the further workpiece.

Subsequently, a rotating friction tool having a rosette shaped working surface and a central spike extending away from said working surface, is moved onto the front surface of the projection, so that the friction between the spike and the projection causes the material of the projection to plasticize and to be displaced to the sides and into the cavities of the rosette shaped working surface, while the friction tool is moved further towards the further workpiece and the spike further penetrates the projection. When the lateral sides of the working surface contact the second surface of the further workpiece the shape of the working surface including the cavities receiving the displaced material of the projection has formed the material of the projection into a rosette shaped stake which positively locks the further workpiece to the plastic workpiece.

However, such a joint may be disadvantageous, because in order to positively lock the further workpiece to the plastic workpiece the rosette shaped stake projects up from the second surface of the further workpiece so that there is no smooth second surface of the further workpiece. Another drawback of the joint known in the art is that an undesirable high amount of material is necessary in order to form the rosette shaped stake, which in turn introduces undesirable additional weight for the two workpieces to be joined.

Therefore, there remains a need in the art for a method for joining a plastic workpiece to a further workpiece, wherein a safe and reliable joint is established while at the same time a possibly smooth second surface of the further workpiece is formed and as little material as possible and, thus, as little weight as possible is required for said joint.

SUMMARY

This section provides a general summary of the disclosure, and is not a comprehensive disclosure of its full scope or all of its features.

In one form, the present disclosure provides a method for joining a plastic workpiece (1) to a further workpiece (3). The method can include: providing a plastic workpiece having an abutment surface and a projection, wherein said projection projects away from the abutment surface and has a front surface; providing a further workpiece having a first surface, a second surface opposite to the first surface, and a through hole which connects the first surface to the second surface and which is defined by a side wall, wherein an undercut is provided in the side wall; arranging the plastic workpiece relative to the further workpiece such that the abutment surface of the plastic workpiece abuts on the first surface of the further workpiece and the projection extends through the through hole; providing a friction tool that is configured for rotation about an axis of rotation, the friction tool having a base surface, which extends transversely to the axis of rotation, and a pin that extends along the axis of rotation away from the base surface, wherein an end of the pin that is disposed furthest from the base surface has a friction surface that extends transversely to the axis of rotation; rotating the friction tool about the axis of rotation; linearly moving the friction tool in parallel to the axis of rotation towards the projection so that the friction surface contacts the front surface of the projection; linearly moving of the friction tool along the axis of rotation while rotating the friction tool so that the pin penetrates the material of the projection, plasticizes said material, and laterally displaces said material into the undercut; and retracting the friction tool from the projection.

The plastic workpiece that is provided can have an abutment surface and a projection. The projection can project away from the abutment surface and can have a front surface and a side surface. The front surface can extend generally parallel to the abutment surface. The side surface can extend in a circumferential manner and transversely to the abutment surface.

The further workpiece that is provided can have a first surface, a second surface opposite to the first surface, and a through hole. The further workpiece may be of any material, but is preferably formed of metal. The through hole, which can have a circular cross section, connects the first surface to the second surface and is defined, i.e. surrounded, by a correspondingly shaped (e.g., circumferential) side or hole wall. An undercut is provided in the hole wall, which preferably extends about the perimeter of the hole wall (e.g., in a circumferential manner).

The plastic workpiece can be arranged relative to the further workpiece such that the abutment surface of the plastic workpiece abuts on the first surface of the further workpiece and the projection extends through the through hole. The projection, in particular the front surface of the projection when viewed from the plastic workpiece, exceeds (i.e., extends beyond) the second surface of the further workpiece. The dimensions of the projection and the through hole are preferably adjusted such that a gap between the side surface of the projection and the hole wall is either minimized or does not exist. However, by the method according to the invention it is even possible to achieve a reliable joint having the desired shape, although a certain gap between the side surface of the projection and the hole wall exists.

The friction tool that is provided is configured for rotation about an axis of rotation. The friction tool has a base surface extending transversely, preferably perpendicularly, to the axis of rotation, and a pin which extends along the axis of rotation and away from the base surface. The pin at its end remote from the base surface has a friction surface, which extends transversely, preferably perpendicularly, to the axis of rotation. The friction tool is preferably made of metal or ceramic material.

The friction tool is rotated about the axis of rotation, wherein at the same time or subsequently, the friction tool is moved linearly in parallel to the axis of rotation towards the projection, so that the friction surface contacts the front surface of the projection, wherein upon friction between the friction surface and the front surface the material of the projection is plasticized.

Subsequently, while rotating, the friction tool is moved further linearly along the axis of rotation, so that the pin further penetrates the material of the projection, plasticizes said material, and laterally displaces said material into the undercut and towards the hole wall, thereby rendering it possible to close any possible gap between the hole wall and the side surface of the projection. Preferably, this is carried out until the base surface of the friction tool contacts the second surface of the further workpiece. In this context the base surface is defined as the entire surface of the friction tool surrounding the pin and pointing in the direction of the pin. It may be sufficient that only a part of the base surface contacts the second surface of the further workpiece.

As an alternative to a method in which the rotating friction tool is moved linearly until the base surface of the friction tool contacts the second surface of the further workpiece, the rotation of the friction tool can be stopped and the friction tool can then be pressed and moved further linearly along the axis of rotation so that the pin further penetrates the material of the projection and laterally displaces said material towards the hole wall and into the undercut. This linear movement can be performed until the base surface of the friction tool contacts the second surface of the further workpiece. In such a manner, displacing and compressing of the plasticized material can be improved.

Subsequently, the linear movement of the friction tool can be stopped and the friction tool can be held still in a fixed position for a predetermined time until the material of the projection sufficiently solidifies and does not shrink or move undesirably after retracting the friction tool, particularly with respect to plastic materials with a high coefficient of thermal expansion.

The friction tool can be retracted from the projection. Preferably, while retracting the friction tool does not rotate. However, the friction tool may also be rotated while retracting.

The method can produce a joint between the plastic workpiece and the further workpiece that does not project upwards from the second surface of the further workpiece so that a flat and smooth second surface can be reached, and wherein the stake, i.e. the deformed projection which secures the further workpiece to the plastic workpiece by being received in the undercut in a positive locking manner, can be formed as a thin walled hollow body which provides for a safe joint and at the same time requires considerably little material, and thus introduces considerably little weight. Moreover, the friction tool design can reduce or eliminate a possible gap between the side surface of the projection and the hole wall, and thus allows workpieces with loose tolerances to be used, thereby reducing costs. Further, such hollow shape of the stake (if employed) can improve heat distribution by the friction tool over the volume of the projection.

The stake can be in the form of a thin walled hollow body can be produced by the pin of the friction tool having a flat front surface, thereby rendering it possible to displace a relatively large amount of material and, as a result, creating a possible large hollow space inside the stake without needing to penetrate deeply into the plastic workpiece under the level of the abutment surface. The size of the hollow space inside the stake and thus the thickness of the wall of the stake can be limited by a required strength of the joint, so that a reasonable strength of the joint can be balanced with a possibly high weight reduction, when designing the joint.

The undercut in the further workpiece receives the plasticized material of the projection which is displaced by the linear movement of the friction tool along the axis of rotation until the base surface contacts the second surface of the further workpiece, so that upon said contact of a flat and smooth base surface around the pin a stake is formed which has a flat and smooth surface in elongation to the second surface of the further workpiece, which is merely interrupted by the hollow space inside the stake. The stake can be configured such that no part of the stake projects up from the second surface.

Optionally, the undercut can be formed as a counterbore or a chamfer which is open to the second surface of the further workpiece. In other words, the counterbore results from the second surface of the further workpiece, i.e. is introduced from the second side. Such a counterbore provides room to receive the displaced plasticized material of the projection in order to form an effective positive locking between the displaced material of the projection, i.e. the stake, and the further workpiece. At the same time, such a counterbore is easy to produce or introduce in the further workpiece and provides access to the undercut from the second surface.

Alternatively, the undercut can be formed as at least one annular recess. The one or more annular recesses may be introduced in the hole wall and can extend in an annular manner around the through hole. Such annular recesses may also provide for an effective positive locking between the further workpiece and the plastic workpiece and at the same time are not visible from the outside, i.e. from the second surface of the further workpiece.

Optionally, the pin can be formed as a frustum of a cone and can have a conical lateral surface that can connect the friction surface to the base surface. The conical lateral surface can taper in the direction of the friction surface. By such a conical pin the plasticized material of the projection can be displaced into the undercut more easily so that the linear movement of the friction tool along the axis of rotation can be carried out easier and faster and the positive locking joint is more reliable.

The radius of the pin at the level of the friction surface is referred to as $r_1$, the radius of the pin at the level of the base surface is referred to as $r_2$, the radius of the through hole is referred to as R, the distance between the friction surface and the base surface, i.e. the length of the pin, is referred to as h, and the thickness of the further workpiece, i.e. the distance between the first surface and the second surface around the through hole, is referred to as t. Optionally, the friction tool and the further workpiece can be configured with parameters a, b, c, which can be defined as follows:

$$a = \frac{r_1}{R}, b = \frac{r_2}{R}, \text{ and } c = \frac{h}{t}.$$

The friction tool and the further workpiece can be formed such that a is between 0.35 and 0.5, preferably between 0.4 and 0.45, further preferably 0.425, such that b is between 0.5 and 0.75, preferably between 0.6 and 0.65, further preferably 0.625, and such that c is between 0.6 and 0.9, preferably between 0.7 and 0.8, further preferably 0.75.

By such geometries of the friction tool and the further workpiece, a highly effective joint between the plastic workpiece and the further workpiece can be established, i.e. a strong and reliable joint can be formed while at the same time the weight of said joint can be reduced. In other words, the geometric design described before represents a reasonable compromise between a possible high reduction of weight and at the same time a joint which is still reliable and strong enough to hold the plastic workpiece and the further workpiece together.

As described in the following paragraphs, the amount of possible reduction of weight of the joint depends on the geometry of the friction tool and the further workpiece, i.e. the parameters a, b, c. A weight reduction factor $W_r$ can be defined in terms of a, b, c and be determined in the following manner:

The weight reduction factor for hollow stakes is described by Equation 1:

$$W_r = \frac{(V_{SS} - V_{HS})}{V_{SS}} \times 100\% = \frac{V_{DM}}{V_{SS}} \times 100\% \quad (1)$$

wherein The displaced material volume $V_{DM}$ is the volume of the conical pin, and can be described by the dimensions $r_1$, $r_2$, and h; $V_{SS}$ is the volume of the solid stake and, thus, of the through hole, described by the dimensions R and t. $V_{HS}$ is the volume of the hollow stake. $V_{SS}$ can be defined as the volume of a cylinder $V_{cyl}$ as in Equation 2. Values for "r" and "h" can be obtained as follows:

$$V_{SS} = V_{cyl} = \pi r^2 h [m^3], \quad (2)$$

wherein r=R [m], h=t [m].

Substituting the values of r and h, we obtain Equation 3 for $V_{SS}$:

$$V_{SS} = \pi R^2 t [m^3]. \quad (3)$$

The volume $V_{DM}$ is the volume of the conical pin, which has the shape of a frustum of a cone, the Volume of which is noted $V_{fc}$ as in Equation 4:

$$V_{DM} = V_{fc} = \frac{\pi h}{3}([r_1]^2 + [r_2]^2 + r_1 r_2)[m^3] \quad (4)$$

Functions of R and t for $r_1$, $r_2$, and h are described below:

$$r_1 = aR[m], r_2 = bR[m], h = ct[m].$$

Therefore, $V_{DM}$ can be rewritten as Equation 5:

$$V_{DM} = \frac{\pi c t}{3}([aR]^2 + [bR]^2 + aRbR) = \frac{c(a^2 + b^2 + ab)}{3}\pi R^2 t[m^3] \quad (5)$$

Using Equations 3 and 5, Equation 1 can be redefined as Equation 6:

$$W_r = \frac{V_{DM}}{V_{SS}} \times 100\% = \quad (6)$$

-continued $$\frac{c(a^2 + b^2 + ab)}{3}\frac{\pi R^2 t}{\pi R^2 t} \times 100\% = \frac{c(a^2 + b^2 + ab)}{3} \times 100\%$$

From Equation 6, one can define weight reduction factors for any combinations of R and t of a further workpiece to be joined. Therefore, the geometry of the friction tool and of the projection may be determined by only knowing the geometry of the through hole.

The following Table 1 defines a range of dimensions for a conical pin design, i.e. a range of values for the parameters a, b, and c, generating weight reductions from 5% to 76%. The weight reduction factor is calculated through Equation 6.

| $a = \frac{r_1}{R}$ | $b = \frac{r_2}{R}$ | $c = \frac{h}{t}$ | $\frac{c}{3}(a^2 + b^2 + ab)$ | $W_r$ [%] |
|---|---|---|---|---|
| 0.300 | 0.400 | 0.400 | 0.049 | 5 |
| 0.400 | 0.500 | 0.500 | 0.102 | 10 |
| 0.375 | 0.527 | 0.780 | 0.160 | 16 |
| 0.500 | 0.667 | 0.596 | 0.204 | 20 |
| 0.577 | 0.697 | 0.750 | 0.305 | 30 |
| 0.583 | 0.750 | 0.900 | 0.402 | 40 |
| 0.667 | 0.828 | 0.900 | 0.505 | 50 |
| 0.833 | 1.000 | 0.900 | 0.758 | 76 |

Accordingly, up to 76% weight reduction of a staked joint can be achieved by using a conical pin according to the invention, needing only to define the radius R of the through hole of the further workpiece, and its thickness t.

The factors a and b will affect the wall thickness. The value of a must be smaller than b, so that the tool tip has a conical shape. The difference between a and b, along with the c value, define the angle of the conical shape. These factors must be taken in account to achieve a strong joint with sufficiently thick walls, but also to achieve possibly high weight reduction and efficient heat distribution over the stake volume.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

FIG. 2 is a cross sectional view of the friction tool of FIG. 1a;

FIG. 4 is a perspective view of the further workpiece of FIG. 1a;

Corresponding reference numerals indicate corresponding parts throughout the several views of the drawings.

DETAILED DESCRIPTION

With reference to FIG. 1, an exemplary method for joining a plastic workpiece 1 to a further workpiece 3 according to the teachings of the present disclosure is illustrated, showing five particular method steps or stages in FIGS. 1a to 1e.

Figure 1A:
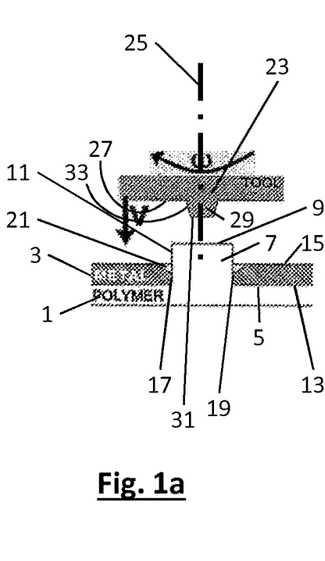
FIGS. 1a through 1e are sectional views of a plastic workpiece, a further workpiece and a friction tool during various stages of a method performed in accordance with the teachings of the present disclosure.

A plastic workpiece 1 made of a polymer material can be provided having an abutment surface 5 and a projection 7. The projection 7 projects away from the abutment surface 5 and can have a front surface 9 that can extend in parallel to the abutment surface 5. Further, the projection 7 can have an annular side surface 11 that can extend transversely to the abutment surface 5.

A further workpiece 3, which is formed of metal in the particular example provided, can have a first surface 13, a second surface 15 opposite to the first surface 13, and an annular through hole 17 which connects the first surface 13 to the second surface 15. The through hole 17 is defined by an annular hole wall 19 which comprises an undercut 21. Said undercut 21 in the present embodiment is formed as a counterbore or a chamfer.

The plastic workpiece 1 can be arranged relative to the further workpiece 3 in such a manner that the abutment surface 5 of the plastic workpiece 1 abuts on the first surface 13 of the further workpiece 3 and the projection 7 extends through the through hole 17. The projection 7 can exceed (i.e., can be longer than) the second surface 15 of the further workpiece 3 such that the front surface 9 of the projection 7, when viewed from the plastic workpiece 1, extends further away from the abutment surface 5 than the second surface 15 of the further workpiece 3. The projection 7 and the through hole 17 can be formed such that a minimum gap or no gap is left between the hole wall 19 and the side surface 11 of the projection 7. It will be appreciated, however, the desired joint can also be established when there is a certain gap between the hole wall 19 and the side surface 11.

A friction tool 23 configured for rotation about an axis of rotation 25 is provided. The friction tool 23 can have a base surface 27, which can extend perpendicularly to the axis of rotation 25, and a pin 29 that can extend along the axis of rotation 25 away from the base surface 27. At its end remote from the base surface 27, the pin 29 has a friction surface 31 that can extend perpendicularly to the axis of rotation 25. Further, the friction tool 23 is made of metal material and can have a conical lateral surface 33 that connects the friction surface 31 to the base surface 27 (see FIG. 1a).

As shown in FIG. 1a, the friction tool 23 can be rotated about the axis of rotation 25 and linearly moved in parallel to the axis of rotation 25 towards the projection 7 until the friction surface 31 contacts the front surface 9 of the projection 7. The friction between the friction surface 31 of the pin 29 and the front surface 9 of the projection 7 can cause the plastic material of the projection 7 to plasticize, which permits the pin 29 to penetrate into the plasticized plastic material of the projection 7.

Figure 1B:
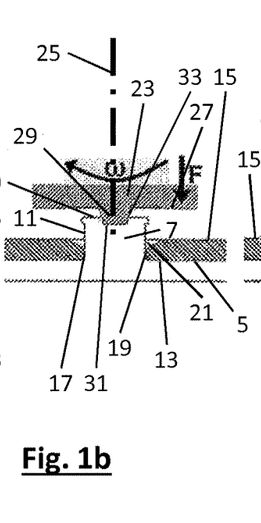

Subsequently, as shown in FIG. 1b, continued rotation and linear movement of the friction tool 23 about and along the axis of rotation 25 permits the pin 29 to penetrate the material of the projection 7 so that the friction tool 23 further plasticizes the material of the projection 7 and laterally displaces the plasticized material of the projection 7 into the undercut 21 formed in the further workpiece 3.

Figure 1C:
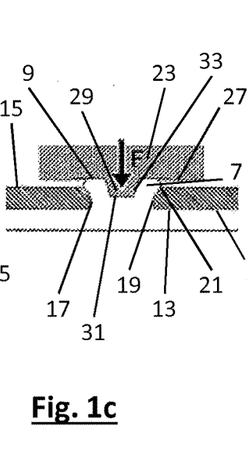

The rotation of the friction tool 23 can be stopped and the friction tool 23 can be pressed and moved further linearly along the axis of rotation 25 so that the pin 29 further penetrates the material of the projection 7 and laterally displaces said material towards the hole wall 19 and into the undercut 21 (see FIG. 1c). This linear movement can be performed until the base surface 27 of the friction tool 23 contacts the second surface 15 of the further workpiece 3 (see FIG. 1d).

Figure 1D:
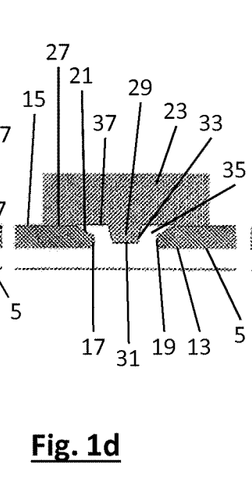

If desired, the linear movement of the friction tool 23 can be halted and the friction tool 23 can be held still in a fixed position for a predetermined time until the material of the projection 7 sufficiently solidifies and does not shrink or move undesirably after retracting the friction tool 23 (see FIG. 1d).

Figure 1E:
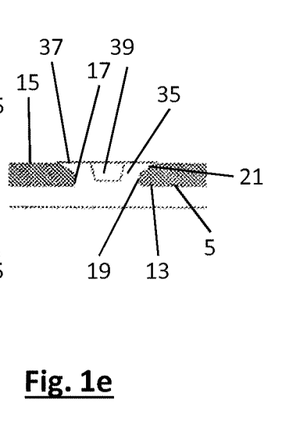

As shown in FIG. 1e, the friction tool 23 can be retracted from the plastic workpiece 1 and the further workpiece 3, so that the pin 29 is retracted out of the projection 7. As a result, a joint between the plastic workpiece 1 and the further workpiece 3 can be formed such that the joint comprises a hollow stake 35 which has a flat surface 37 in line with the second surface 15 of the further workpiece 3. The hollow space 39 in the stake 35 can form a recess from said flat and smooth second surface 15. The plastic workpiece 1, the further workpiece 3, and the friction tool 23 are adapted such that the material of the projection 7 which exceeds (i.e., extends beyond) the second surface 15 of the further workpiece 3 and the material of the projection 7 which is displaced by the pin 29 of the friction tool 23 during performance of the method, can be entirely received into the undercut 21, so that the base surface 27 of the friction tool 23 can contact the second surface 15 of the further workpiece 3 and no material of the projection 7 projects up the second surface 15 of the further workpiece 3.

Figure 2:
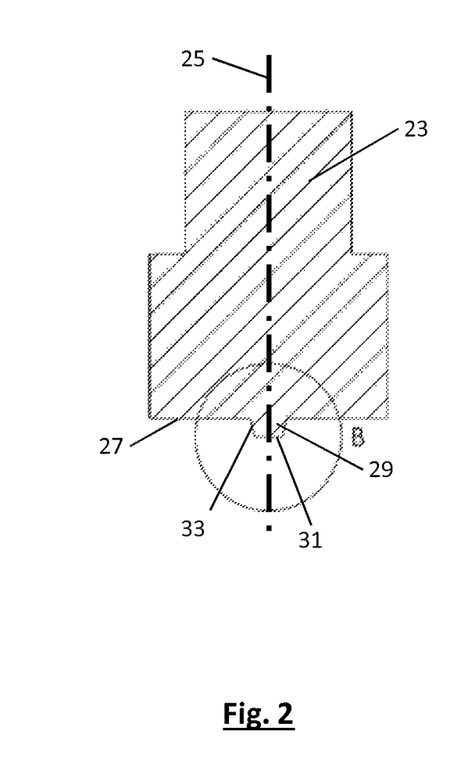
Figure 3:
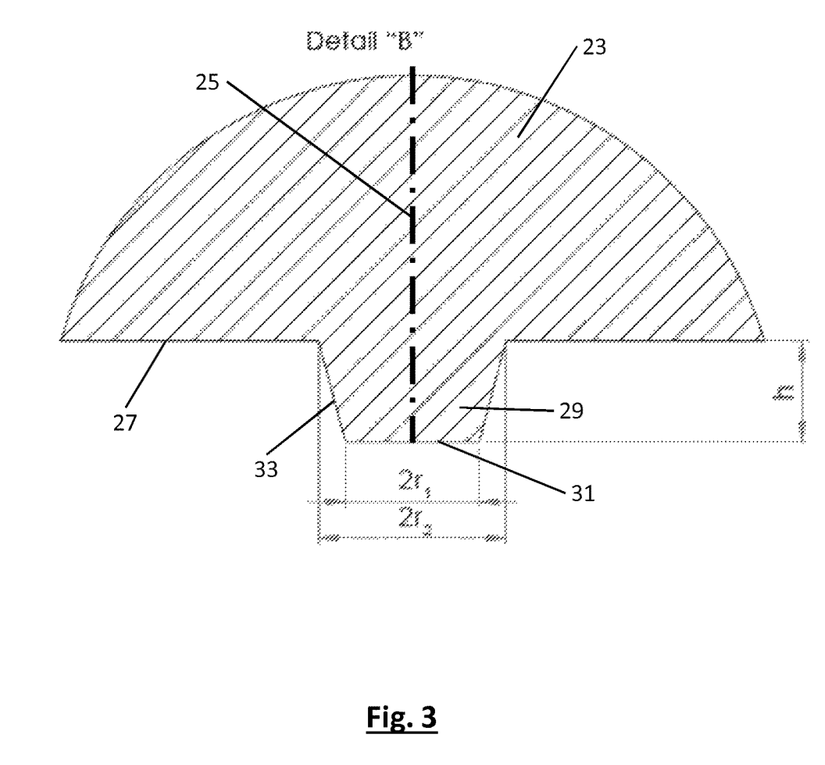
FIG. 3 is an enlarged portion of FIG. 2 illustrating a pin of the friction tool in greater detail.

As shown in more detail in FIGS. 2 and 3, the pin 29 of the friction tool 23 can be formed as a frustum of a cone and has a conical lateral surface 33 that can connect the friction surface 31 to the base surface 27. The radius of the pin 29 at the level of the friction surface 31 is referred to as $r_1$, the radius of the pin 29 at the level of the base surface 27 is referred to as $r_2$, and the distance between the friction surface 31 and the base surface 27 is referred to as h.

Figure 4:
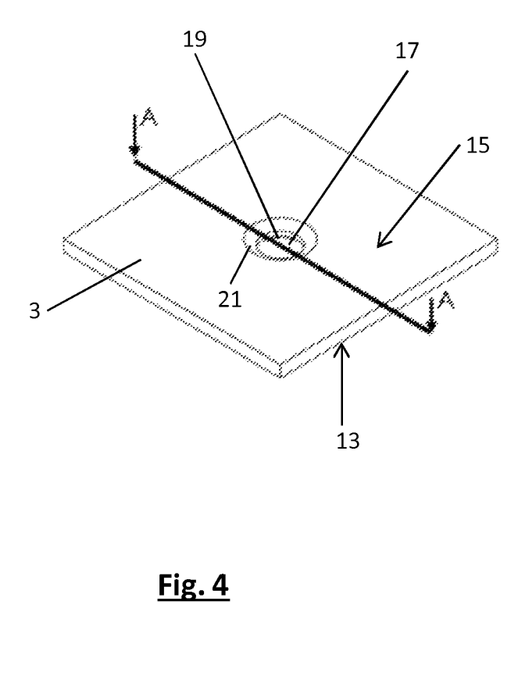
Figure 5:
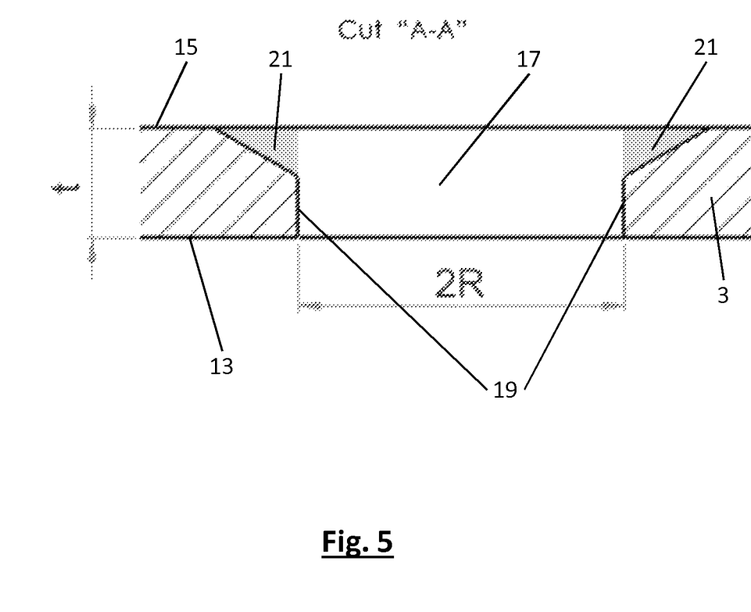
FIG. 5 is a cross sectional view taken along the line A-A of FIG. 4.

As shown in more detail in FIGS. 4 and 5 the further workpiece 3 comprises an undercut 21 which can be formed as a counterbore or chamfer that is open to the second surface 15. The radius of the through hole 17 in the further workpiece 3 is referred to as R and the thickness of the further workpiece 3 is referred to as t.

In order to provide a best compromise between a strong and reliable joint between the plastic workpiece 1 and the further workpiece 3, and at the same time a possibly high reduction of weight by a possibly large hollow space 39 in the stake 35, i.e. in the deformed projection 7, a certain geometry is determined for the friction tool 23 based on the geometry of the further workpiece 3. Therefore, the three parameters a, b, c are defined in the following manner:

$$a = \frac{r_1}{R}, \ b = \frac{r_2}{R}, \ \text{and} \ c = \frac{h}{t},$$

wherein in the particular example provided, a is determined as 0.375, b is determined as 0.527, and c is determined as 0.78, which results in a weight reduction factor $W_r$ of 16%.

Figure 6A:
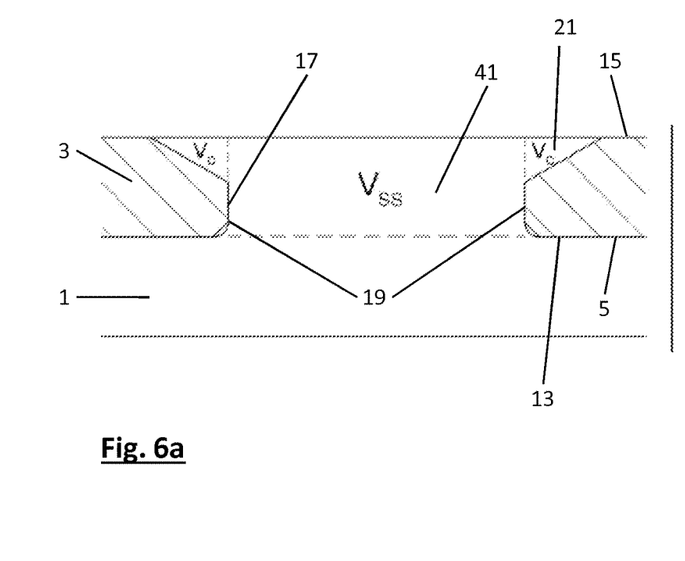
FIG. 6a is a schematic cross sectional view of a joint that employs a solid stake.
Figure 6B:
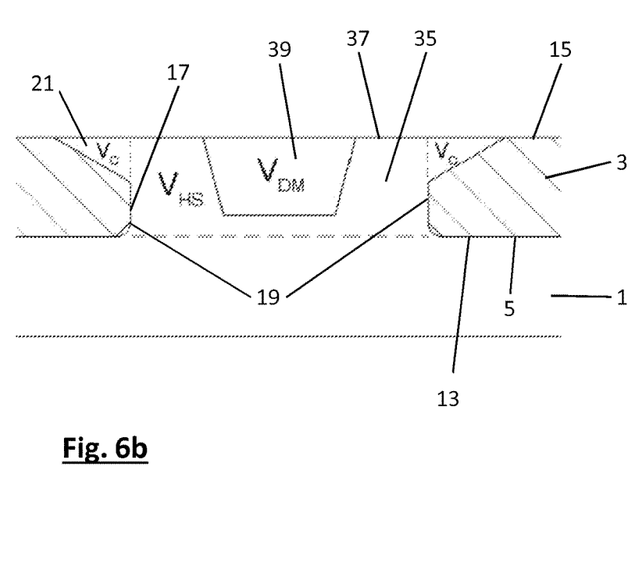
FIG. 6b is a schematic cross sectional view of a joint that employs a hollow stake produced in accordance with the method of the present disclosure.

In FIG. 6a solid stake 41 (see FIG. 6a) as it is known in the art without any hollow space 39 is compared to a hollow stake 35 (FIG. 6b) which is produced according to a method of the present invention. In FIG. 6 $V_{SS}$ represents the volume of the solid stake 41 which equals the volume of the through hole 17, $V_{HS}$ represents the volume of the hollow stake 35, $V_{DM}$ represents the volume of the displaced material, and $V_c$ represents the volume of the undercut 21.

Figure 7:
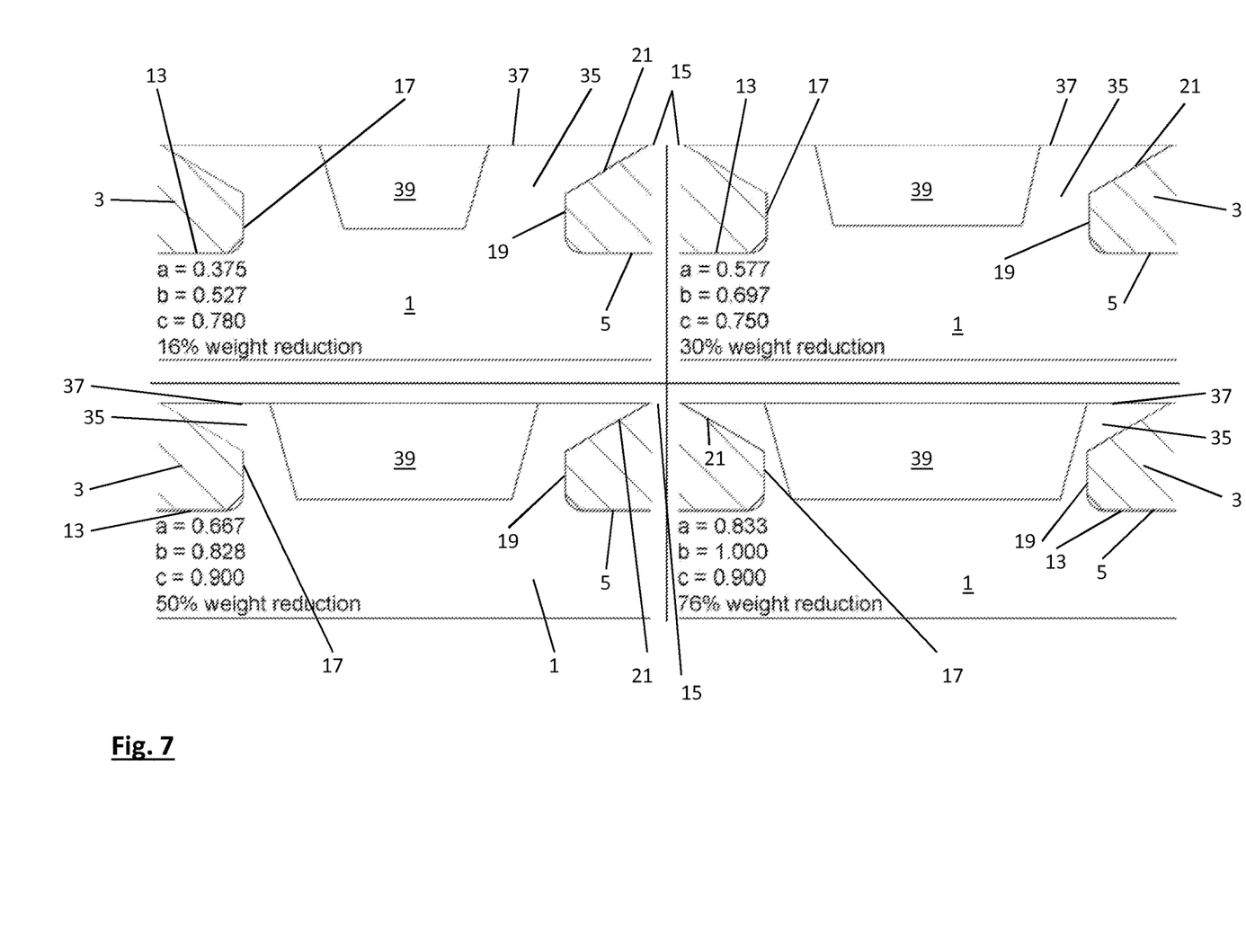
FIG. 7 is a collection of four schematic cross sectional views, each of which depicting a joint produced in accordance with the method of the present disclosure, the collection depicting hollow stakes of different weight reduction factors depending on different geometries.

In FIG. 7 four hollow stakes 35 of different weight reduction factors $W_r$, produced in accordance with a method of the present invention are compared, wherein in FIG. 7a a=0.375, b=0.527, c=0.78, so that the weight reduction factor $W_r$=16%, wherein in FIG. 7b a=0.577, b=0.697, c=0.75, so that the weight reduction factor $W_r$=30%, wherein in FIG. 7c a=0.667, b=0.828, c=0.9, so that the weight reduction factor $W_r$=50%, and wherein in FIG. 7d a=0.833, b=1.0, c=0.9, so that the weight reduction factor $W_r$=76%.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A method for joining a plastic workpiece (1) to a further workpiece (3), the method comprising:
    providing a plastic workpiece (1) having an abutment surface (5) and a projection (7), wherein said projection (7) projects away from the abutment surface (5) and has a front surface (9);
    providing a further workpiece (3) having a first surface (13), a second surface (15) opposite to the first surface (13), and a through hole (17) which connects the first surface (13) to the second surface (15) and which is defined by a side wall (19), wherein an undercut (21) is provided in the side wall (19);
    arranging the plastic workpiece (1) relative to the further workpiece (3) such that the abutment surface (5) of the plastic workpiece (1) abuts on the first surface (13) of the further workpiece (3) and the projection (7) extends through the through hole (17);
    providing a friction tool (23) that is configured for rotation about an axis of rotation (25), the friction tool (23) having a base surface (27), which extends transversely to the axis of rotation (25), and a pin (29) that extends along the axis of rotation (25) away from the base surface (27), wherein an end of the pin (29) that is disposed furthest from the base surface (27) has a friction surface (31) that extends transversely to the axis of rotation (25), wherein the pin (29) is formed as a frustum of a cone and has a conical lateral surface (33) that connects the friction surface (31) to the base surface (27), wherein the radius of the pin (29) at the level of the friction surface (31) is referred to as r1 wherein the radius of the pin (29) at the level of the base surface (27) is referred to as r2, wherein the radius of the through hole (17) is referred to as R, wherein the distance between the friction surface (31) and the base surface (27) is referred to as h, wherein the thickness of the further workpiece (3) is referred to as t, wherein parameters a, b and c are defined as: a=r1/R, b=r2/R, and c=h/t;
    wherein the friction tool (23) and the further workpiece (3) are formed such that a value of parameter a is between 0.35 and 0.5, a value of parameter b is between 0.5 and 0.75 and a value of parameter c is between 0.6 and 0.9;
    rotating the friction tool (23) about the axis of rotation (25);
    linearly moving the friction tool (23) in parallel to the axis of rotation (25) towards the projection (7) so that the friction surface (31) contacts the front surface (9) of the projection (7);
    linearly moving of the friction tool (23) along the axis of rotation (25) while rotating the friction tool (23) so that the pin (29) penetrates the material of the projection (7), plasticizes said material, and laterally displaces said material into the undercut (21); and
    retracting the friction tool (23) from the projection (7).

2. The method according to claim 1, wherein after said material is laterally displaced into the undercut (21), the method further comprises halting rotation of the friction tool (23) and moving the friction tool (23) linearly along the axis of rotation (25) so that the pin (29) further penetrates the material of the projection (7) and laterally displaces said material towards the hole wall (19) and into the undercut (21).

3. The method according to claim 2, wherein prior to retracting the friction tool (23), the method further comprises halting the linear movement of the friction tool (23) such that the friction tool (23) is maintained in a fixed position.

4. The method according to claim 1, wherein the undercut (21) is formed as a counterbore or chamfer which is open to the second surface (15).

5. The method according to claim 1, wherein the undercut (21) is formed as an annular recess.

6. The method according to claim 1, wherein the value of the parameter a is between 0.4 and 0.45.

7. The method according to claim 1, wherein the value of the parameter b is between 0.6 and 0.65.

8. The method according to claim 1, wherein the value of the parameter c is between 0.7 and 0.8.

9. The method according to claim 8, wherein the value of the parameter a is 0.425, the value of the parameter b is 0.625 and the value of the parameter c is 0.75.

10. The method according to claim 6, wherein the value of the parameter b is between 0.6 and 0.65.

11. The method according to claim 10, wherein the value of the parameter c is between 0.7 and 0.8.

12. The method according to claim 6, wherein the value of the parameter c is between 0.7 and 0.8.

13. The method according to claim 7, wherein the value of the parameter c is between 0.7 and 0.8.

14. The method according to claim 1, wherein the pin of the friction tool forms a cavity in the projection and wherein the cavity extends below an exterior surface of the further workpiece that faces away from the plastic workpiece.

15. The method according to claim 14, wherein the cavity extends below the exterior surface of the further workpiece to a first depth that is greater than a second depth of the undercut from the exterior surface of the further workpiece.

* * * * *

UNITED STATES PATENT AND TRADEMARK OFFICE
CERTIFICATE OF CORRECTION

PATENT NO. : 9,925,720 B2  
APPLICATION NO. : 14/807911  
DATED : March 27, 2018  
INVENTOR(S) : André Bastos Abibe et al.

Page 1 of 1

It is certified that error appears in the above-identified patent and that said Letters Patent is hereby corrected as shown below:

On the Title Page

Item (54) and in the Specification, Column 1, Line 2, delete "WORKPLACE" and insert --WORKPIECE--, therefor.

Signed and Sealed this  
Twenty-fourth Day of July, 2018

Andrei Iancu  
*Director of the United States Patent and Trademark Office*